United States Patent
Weingarten

(10) Patent No.: US 7,398,955 B2
(45) Date of Patent: Jul. 15, 2008

(54) GRIPPING VALVE SEAT

(75) Inventor: Zvi Weingarten, Kibbutz Evron (IL)

(73) Assignee: Bermad Limited Partnership, Kibbutz Evron (IL)

( * ) Notice: Subject to any disclaimer, the term of this patent is extended or adjusted under 35 U.S.C. 154(b) by 275 days.

(21) Appl. No.: 11/315,266

(22) Filed: Dec. 23, 2005

(65) Prior Publication Data

US 2007/0145323 A1     Jun. 28, 2007

(51) Int. Cl.
*F16K 1/42*     (2006.01)
(52) U.S. Cl. ....................... 251/363; 251/360
(58) Field of Classification Search .............. 251/363, 251/359, 360, 316; 137/315.2, 315.21, 315.3; 277/628
See application file for complete search history.

(56) References Cited

U.S. PATENT DOCUMENTS

| | | | | |
|---|---|---|---|---|
| 2,631,577 A | * | 3/1953 | Carter | 123/188.8 |
| 3,165,101 A | * | 1/1965 | Vargyai | 123/188.8 |
| 5,217,205 A | * | 6/1993 | Bartoschek et al. | 251/367 |
| 5,247,960 A | * | 9/1993 | Kornfeldt et al. | 137/315.31 |
| 5,377,954 A | * | 1/1995 | Adams et al. | 251/306 |

* cited by examiner

*Primary Examiner*—John Rivell
*Assistant Examiner*—Atif H Chaudry
(74) *Attorney, Agent, or Firm*—Mark M. Friedman Ltd.

(57) ABSTRACT

The valve seat of the present invention is configured for attachment to the valve housing after the valve housing has been coated with a protective coating. The valve seat is configured to grip the valve housing, thereby providing a secure attachment. In its simplest form, the valve seat and the valve housing are both configured with corresponding locking-ring grooves, and a locking-ring element is positioned so as to be at least partially deployed in both the valve seat locking-ring groove and the valve housing locking-ring groove simultaneously. It will be appreciated that the features of the present invention may be used to benefit with substantially any type and style of valve known in the art.

19 Claims, 4 Drawing Sheets

GRIPPING VALVE SEAT

FIELD AND BACKGROUND OF THE INVENTION

The present invention relates to valve seats and, in particular, it concerns a valve seat that is grippingly attached to the valve housing.

Within the art of attaching a valve seat to a valve housing, the generally practiced method is to affix the valve seat to the valve housing using an adhesive, mask the valve seat and then coat the entire unit with a protective coating. Once the coating has dried, the masking is removed from the valve seat.

This process is necessary to assure good adhesion to the valve housing before coating. However, the masking and unmasking process is time consuming and tedious. Further, the unmasking can crack or peel the coating, resulting in premature corroding of the valve housing.

Attaching the valve seat to the valve housing using adhesives generally makes replacement of valve seats impractical, resulting in the replacement of the entire valve even if the valve seat is the only portion requiring replacement.

There is therefore a need for a valve seat that is grippingly attachable to the valve housing after the coating process has been completed.

SUMMARY OF THE INVENTION

The present invention is a valve seat that is grippingly attachable to the valve housing after the coating process has been completed.

According to the teachings of the present invention there is provided, a valve seat configuration comprising: a) a valve housing having an interface area configured with at least one valve housing locking groove; b) a valve seat body having a flow channel, an inner surface and an outer surface, the outer surface configured to contact the interface area, the outer surface configured with at least one valve seat locking groove circumscribing the valve seat body; and c) at least one locking element configured for initial deployment in one of the valve seat locking groove and the valve housing locking groove; wherein displacement of the locking element so as to be at least partially deployed in both the valve seat locking element groove and the valve housing locking element groove attaches the valve seat to the valve housing.

According to a further teaching of the present invention, the valve housing and the valve seat body are configured so as to have cylindrical symmetry.

According to a further teaching of the present invention, there is also provided: a) a plurality of spaced apart through bores passing through the valve seat body from the valve seat locking groove to the inner surface of the valve seat body, the through bores being threaded; and b) a plurality of screw elements configured with threads corresponding to those of the through bores such that the screw elements are inserted into the through bores through openings in the inner surface; wherein displacement of the screw elements from the inner surface toward the outer surface causes the displacement of the locking element.

According to a further teaching of the present invention, the outer surface of the valve seat body is configured with at least one gripping extension, such that the displacement of the locking element at least partially into the valve housing locking groove produces a gripping relationship between the valve seat body and at least a portion of the interface area.

According to a further teaching of the present invention, the gripping relationship between the valve seat body and the interface area includes the area of the interface area located between the gripping extension and the valve housing locking groove.

According to a further teaching of the present invention, the valve housing locking groove includes at least one sloping wall such that the displacement of the locking element at least partially into the valve housing locking groove displaces the valve seat body so as to draw the gripping extension toward at least a portion of the interface area,.

According to a further teaching of the present invention, the locking element is configured as a locking-ring According to a further teaching of the present invention, the locking-ring is configured as a closed helix turning more than 360 degrees.

According to a further teaching of the present invention, there is also provided: a) an O-ring groove configured in the valve seat body; and b) an O-ring deployed in the O-ring groove.

According to a further teaching of the present invention, the valve seat body is configured for attachment to the valve housing subsequent to the application of a protective coating to the valve housing.

There is also provided according to the teachings of the present invention, a method for attaching a valve seat to a valve housing, the method comprising: a) providing a valve housing having an interface area configured with at least one valve housing locking groove; b) providing a valve seat body having a flow channel, an inner surface and an outer surface, the outer surface configured to contact the interface area, the outer surface configured with at least one valve seat locking groove circumscribing the valve seat body; c) providing at least one locking element configured for initial deployment in one of the valve seat locking groove and the valve housing locking groove; d) providing at least one displacement element configured to displaced the locking element; and e) displacing the locking element so as to be at least partially deployed simultaneously in both the valve seat locking groove the valve housing locking groove.

According to a further teaching of the present invention, the at least one displacement element is implemented as a plurality of screw elements inserted into a plurality of spaced apart through bores passing through the valve seat body from the valve seat locking groove to the inner surface of the valve seat body, the through bores having threads corresponding to the screw elements such that displacement of the screw elements from the inner surface toward the outer surface causes the displacement of the locking element.

According to a further teaching of the present invention, there is also provided at least one gripping extension configured in the outer surface of the valve seat body, such that the displacement of the locking element at least partially into the valve housing locking groove produces a gripping relationship between the valve seat body and at least a portion of the interface area.

According to a further teaching of the present invention, the gripping relationship between the valve seat body and the interface area is implemented in the area of the interface area located between the gripping extension and the valve housing locking groove.

According to a further teaching of the present invention, the valve housing locking groove is implemented with at least one sloping wall such that the displacement of the locking element at least partially into the valve housing locking groove displaces the valve seat body so as to draw the gripping extension toward at least a portion of the interface area, and thereby enhance the gripping relationship.

According to a further teaching of the present invention, the locking element is implemented as a locking-ring According to a further teaching of the present invention, the locking-ring is implemented as a closed helix turning more than 360 degrees.

According to a further teaching of the present invention, there is also provided: a) providing an O-ring groove configured in the valve seat body; b) providing an O-ring; and c) deploying the O-ring in the O-ring groove.

According to a further teaching of the present invention, there is also provided attaching the valve seat body to the valve housing subsequent to the application of a protective coating to the valve housing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a valve seat that is grippingly attachable to the valve housing after the coating process has been completed.

The principles and operation of a gripping valve seat according to the present invention may be better understood with reference to the drawings and the accompanying description.

By way of introduction, the valve seat of the present invention is configured for attachment to the valve housing after the valve housing has been coated with a protective coating. The application of a protective coating is common in the art. However, the attachment of the valve seat after the coating process is completed is not common in the art.

The valve seat of the present invention is configured to grip the valve housing, thereby providing a secure attachment. In its simplest form, the valve seat and the valve housing are both configured with corresponding locking-ring grooves, and a locking-ring element is deployed so as to be at least partially deployed in both the valve seat locking-ring groove and the valve housing locking-ring groove simultaneously. It will be appreciated that the features of the present invention may be used to benefit with substantially any type and style of valve known in the art. It will be appreciated that the principles of the present invention may be applied with benefit to the mechanical connection of substantially any two cylindrical bodies.

Figure 1:
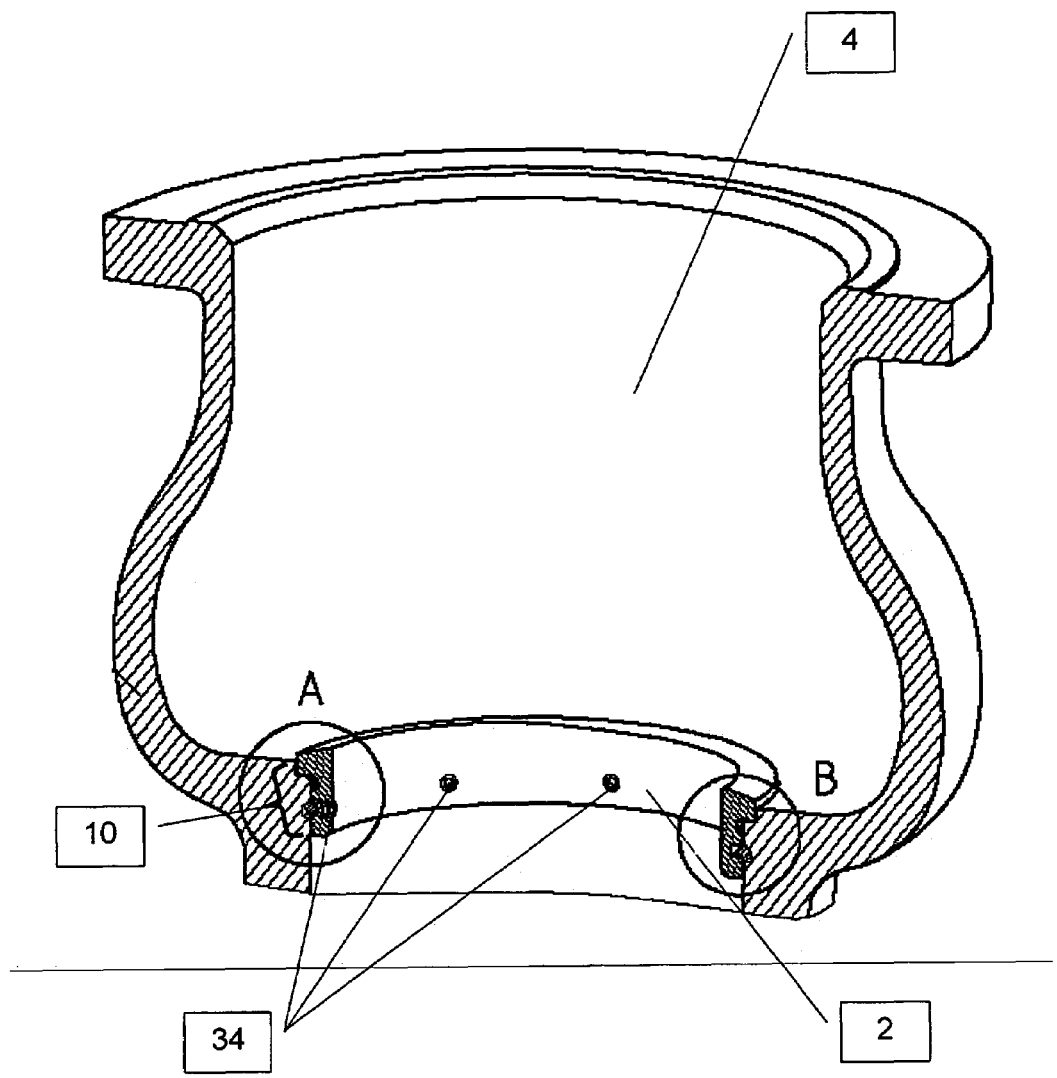
FIG. 1 is an isometric cross sectional view of a valve seat constructed and operative according to the teachings of the present invention, deployed in a valve housing.
Figure 2A:
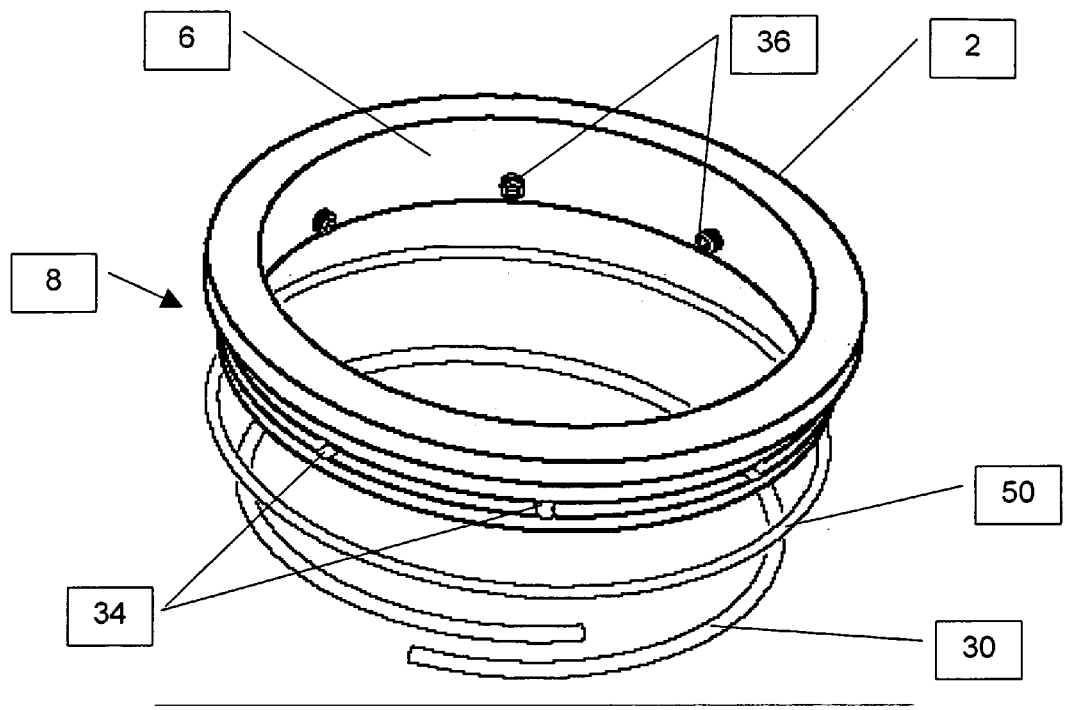
FIG. 2A is an isometric view of the valve seat of FIG. 1.
Figure 2B:
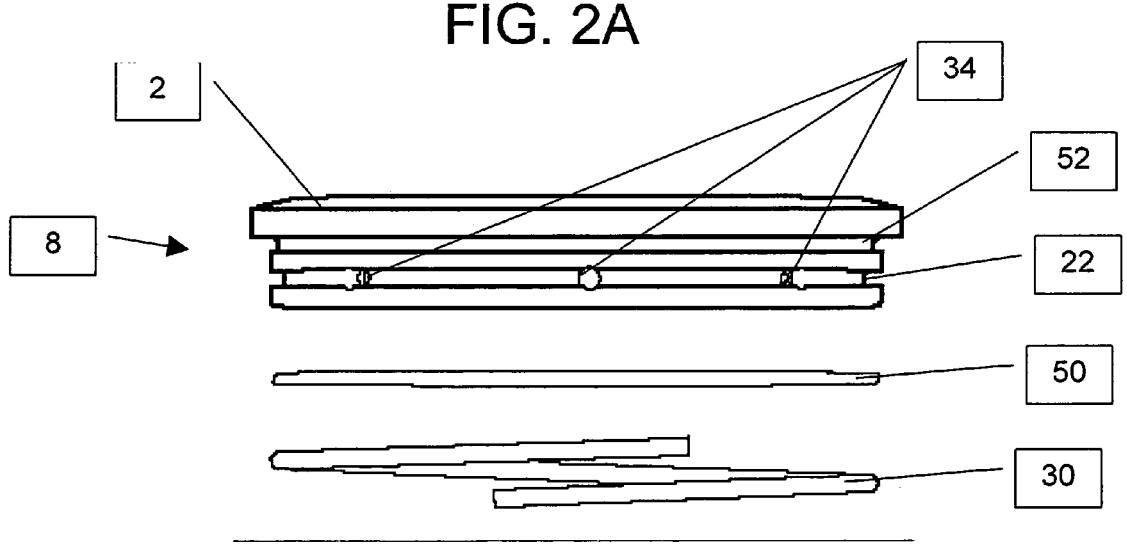
FIG. 2B is a side elevation of the valve seat of FIG. 1.
Figure 3:
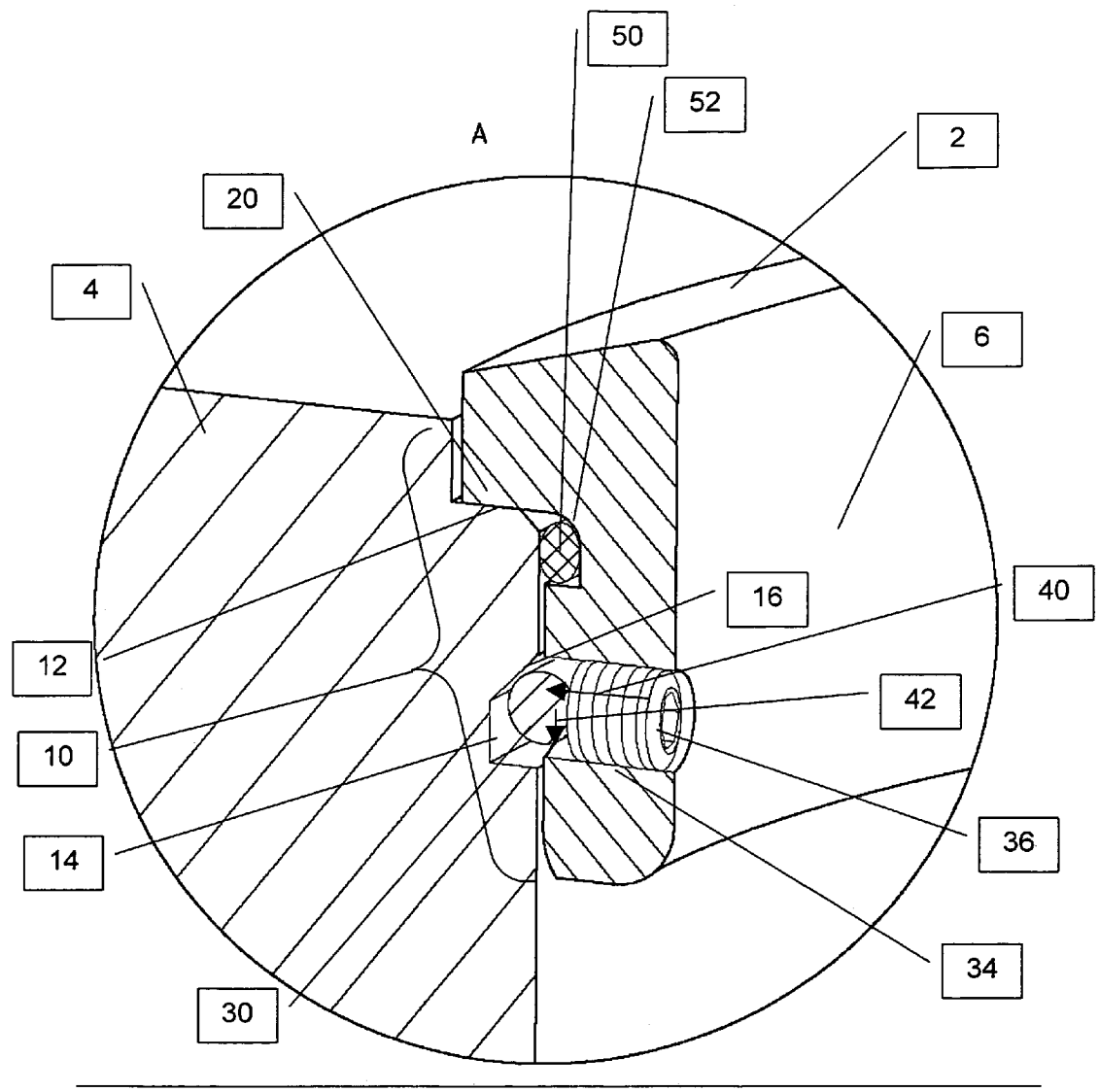
FIG. 3 is an isometric view of detail A of FIG. 1.
Figure 4:
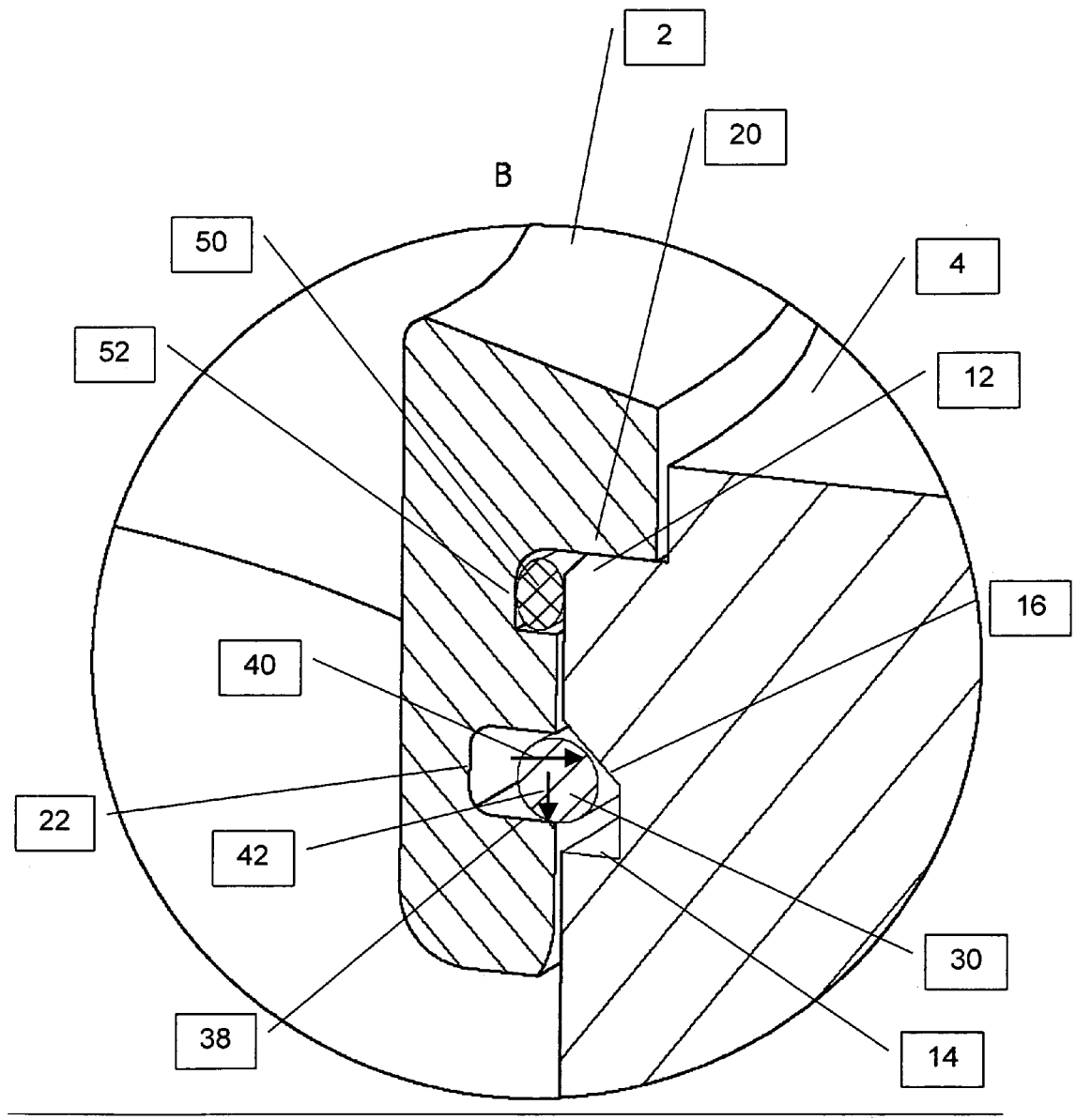
FIG. 4 is an isometric view of detail B of FIG. 1.

Referring now to the drawings, in a preferred embodiment, as illustrated in FIG. 1, the valve seat 2 of the present invention is deployed in the valve housing 4 in a substantially standard location. It will be appreciated that the valve housing 4 and the valve seat 2 have substantially cylindrical symmetry.

As seen in better detail in FIGS. 2A-4, the preferred embodiment of the valve seat 2 of the present invention illustrated herein is configured substantially as a cylinder having a flow channel 60, an outer surface 8 and an inner surface 6.

The outer surface 8 is configured to contact the valve housing 4 along an interface area 10. In this embodiment, the interface area includes a shoulder area 12 and a valve housing locking-ring groove 14. The valve housing locking-ring groove 14 is configured such that the upper wall 16 of the groove 14 slopes toward the shoulder area 12. The outer surface 8 of the valve seat 2 is configured with a gripping extension 20 that extends outwardly from the outer surface 8, and a valve seat locking-ring groove 22 that circumscribes the valve seat 2 and corresponds to the valve housing locking-ring groove 14. Preferably, the gripping extension 20 is configured as a single extension region integrally formed with, and circumscribing, the valve seat 2. However, an embodiment having a plurality of spaced apart extension regions is within the scope of the present invention.

Spaced along the valve seat locking-ring groove 22 are a plurality of threaded through bores 34 that extend through the valve seat 2 with openings located in the valve seat locking-ring groove 22 and the inner surface 6 of the valve seat 2. Into each of the through bores 34 is inserted a setscrew 36 configured with corresponding threads. Turning the setscrews 36 into the through bores 34 causes displacement of the locking-ring 30 outwardly from the valve seat locking-ring groove 22. It should be noted that the setscrews described herein are used as a non-limiting example of a screw element that may be implemented using substantially may threaded element and preferably one with parallel sides.

In this preferred embodiment, the outward displacement (arrow 40) of the locking-ring 30 against the sloping wall 16 of the valve housing locking-ring groove 14 causes the locking-ring 30 to push (arrow 42) against the lower wall 38 and thereby displaces the valve seat body 2 downward so as to draw the gripping extension 20 toward the shoulder area 12 of the interface area 10, and thereby enhance the grip of the valve seat onto the valve housing 4. It should be noted that directional terms such as outwardly, upper, inner, outer, and downward are used herein with regard to the drawings they are used to describe and are not intended as a limitation of any kind.

Preferably, the locking-ring 30 has a substantially circular cross-section and is configured as a resilient closed helical spring turning more than 360 degrees, and has a relaxed diameter that is less that the inside diameter of the valve seat locking-ring groove 22. However, a locking element according to the present invention may of substantially any suitable configuration, cross-section and amount of resilience, and may even be configured as more than one locking element. It should be noted that the locking-ring may be configured so as to turn less than 360 degrees, in which case, it need not be helical.

The valve seat 2 is attached to the valve housing 4 by deploying the locking ring 30 into the valve seat locking-ring groove 22 and turning the setscrews 36 so as to displace the locking-ring 30 toward the valve housing 4 such that the locking-ring 30 is at least partially deployed in both the valve seat locking-ring groove 22 and the valve housing locking-ring groove 14, thereby attaching the valve seat 2 to the valve housing 4.

The embodiment herein illustrated also includes an O-ring 50 deployed in an O-ring groove 52.

As mentioned above, in its simplest form, the valve seat of the present invention may be configured such that the valve housing locking-ring groove 14 has no sloping walls or both walls are sloping in a substantially "V" shape so as to simply lock the valve seat 2 in place.

It should be noted that although the description above is directed toward an embodiment of the present invention in which the locking-ring 30 is initially deployed in the valve seat locking-ring groove 22 and then displaced outwardly into the valve housing locking-ring groove 14, this is not intended as a limitation. It will be readily apparent to one skilled in the art that the principles of the present invention may be applied in the opposite order. That is, for example, the locking ring 30 may be configured with a relaxed diameter that is slightly larger than the inside diameter of the valve housing locking-ring groove 14. The through bores 34 may be configured in the valve housing 4 and extend from the valve housing locking-ring groove 14 to the exterior surface of the valve housing 4. Attachment of the valve seat 2 to the valve housing 4 will then be achieved by displacing the locking-ring 30 inwardly into the valve seat locking-ring groove 22. Such a configuration would be of particular benefit with regard to the connection of two cylindrical bodies in which it is not possible of access the setscrews 36 when they are deployed on the inside of the body. A non-limiting example of this embodiment is connection of lengths of pipe.

It will be appreciated that the above descriptions are intended only to serve as examples and that many other embodiments are possible within the spirit and the scope of the present invention.

What is claimed is:

1. A valve seat configuration comprising:
   (a) a valve housing having an interface area configured with at least one valve housing locking groove, said valve housing locking groove including at least one sloping wall;
   (b) a valve seat body having a flow channel, an inner surface and an outer surface, said outer surface configured to contact said interface area, said outer surface configured with at least one valve seat locking groove circumscribing said valve seat body, said valve seat body including a plurality of spaced apart through bores passing radially through said valve seat body from said valve seat locking groove to said inner surface of said valve seat body, and a plurality of displacement elements inserted into said through bores through openings in said inner surface; and
   (c) at least one locking element configured for initial deployment in one of said valve seat locking groove and said valve housing locking groove;
   wherein outward radial displacement of said displacement elements from said inner surface toward said outer surface causes outward radial displacement of said locking element so as to be at least partially deployed in both said valve seat locking element groove and said valve housing locking element groove so as to contact said sloping wall so as to draw said valve seat body toward said valve housing, thereby attaching said valve seat to said valve housing.

2. The valve seat of claim 1, wherein said valve housing and said valve seat body are configured so as to have cylindrical symmetry.

3. The valve seat of claim 1, further including:
   (a) said through bores being threaded; and
   (b) said displacement elements are configured as a plurality of screw elements configured with threads corresponding to those of said through bores.

4. The valve seat of claim 1, wherein said outer surface of said valve seat body is configured with at least one gripping extension, such that said displacement of said locking element at least partially into said valve housing locking groove produces a gripping relationship between said valve seat body and at least a portion of said interface area.

5. The valve seat of claim 4, wherein said gripping relationship between said valve seat body and said interface area includes the area of the interface area located between said gripping extension and said valve housing locking groove.

6. The valve seat of claim 4, wherein said displacement of said locking element at least partially into said valve housing locking groove displaces said valve seat body so as to draw said gripping extension toward at least a portion of said interface area.

7. The valve seat of claim 1, wherein said locking element is configured as a locking-ring.

8. The valve seat of claim 7, wherein said locking-ring is configured as a closed helix turning more than 360 degrees.

9. The valve seat of claim 1, further including:
   (a) an O-ring groove configured in said valve seat body; and
   (b) an O-ring deployed in said O-ring groove.

10. The valve seat of claim 1, wherein said valve seat body is configured for attachment to the valve housing subsequent to the application of a protective coating to the valve housing.

11. A method for attaching a valve seat to a valve housing, the method comprising:
    (a) providing a valve housing having an interface area configured with at least one valve housing locking groove, said valve housing locking groove including at least one sloping wall;
    (b) providing a valve seat body having a flow channel, an inner surface and an outer surface, said outer surface configured to contact said interface area, said outer surface configured with at least one valve seat locking groove circumscribing said valve seat body, said valve seat body including a plurality of spaced apart through bores passing radially through said valve seat body from said valve seat locking groove to said inner surface of said valve seat body, and a plurality of displacement elements inserted into said through bores through openings in said inner surface;
    (c) providing at least one locking element configured for initial deployment in one of said valve seat locking groove and said valve housing locking groove;
    (d) providing at least one displacement element configured to outwardly radially displaced said locking element; and
    (e) said displacement element so as to outwardly radially displace said locking element so as to be at least partially deployed simultaneously in both said valve seat locking groove said valve housing locking groove so as to contact said sloping wall and thereby draw said valve seat body toward said valve housing.

12. The method of claim 11, wherein said at least one displacement element is implemented as a plurality of screw elements, said through bores having threads corresponding to said screw elements.

13. The method of claim 11, further providing at least one gripping extension configured in said outer surface of said valve seat body, such that said displacement of said locking element at least partially into said valve housing locking groove produces a gripping relationship between said valve seat body and at least a portion of said interface area.

14. The method of claim 13, wherein said gripping relationship between said valve seat body and said interface area is implemented in the area of the interface area located between said gripping extension and said valve housing locking groove.

15. The method of claim 14, wherein said displacement of said locking element displaces said valve seat body so as to draw said gripping extension toward at least a portion of said interface area, and thereby enhance said gripping relationship.

16. The method of claim 11, wherein said locking element is implemented as a locking-ring.

17. The method of claim 16, wherein said locking-ring is implemented as a closed helix turning more than 360 degrees.

18. The method of claim 11, further including:
(a) providing an O-ring groove configured in said valve seat body;
(b) providing an O-ring; and
(c) deploying said O-ring in said O-ring groove.

19. The method of claim 11, further including attaching said valve seat body to the valve housing subsequent to the application of a protective coating to the valve housing.

* * * * *

UNITED STATES PATENT AND TRADEMARK OFFICE
CERTIFICATE OF CORRECTION

PATENT NO. : 7,398,955 B2 Page 1 of 1
APPLICATION NO. : 11/315266
DATED : July 15, 2008
INVENTOR(S) : Zvi Weingarten It is certified that error appears in the above-identified patent and that said Letters Patent is hereby corrected as shown below:

Claim 11 (e), column 6 should be corrected as follows:

> Line 37: insert --operating-- at the beginning of the line
> after (e)
> and before, "said displacement element …"

Signed and Sealed this

Second Day of September, 2008

JON W. DUDAS
*Director of the United States Patent and Trademark Office*